Figure 3:
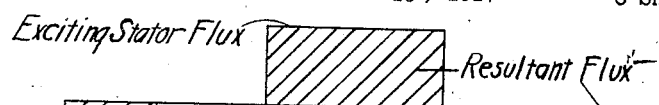

May 15, 1923.
R. E. HELLMUND
DYNAMO ELECTRIC MACHINE
Filed Nov. 19, 1917
1,454,925
6 Sheets-Sheet 1
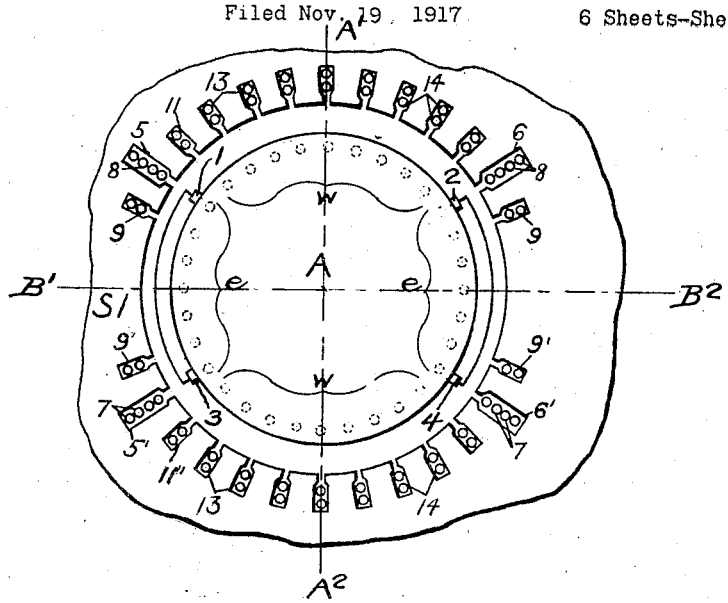
Fig. 1.
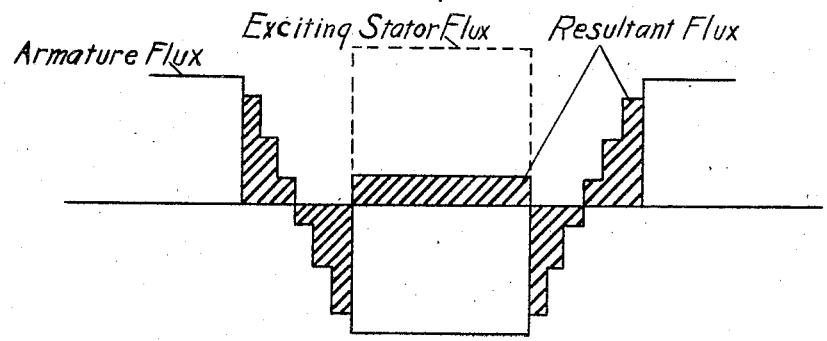
Fig. 2
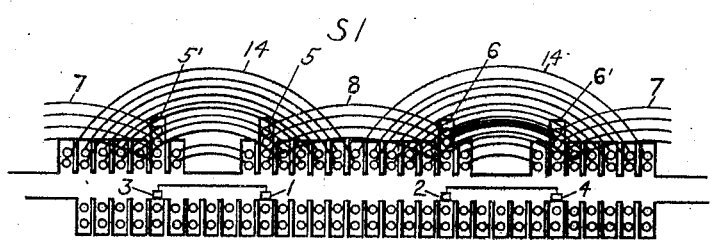
WITNESSES:
W. E. Reece
W. R. Coley
INVENTOR
Rudolf E. Hellmund
BY
Wesley G. Carr
ATTORNEY May 15, 1923.

R. E. HELLMUND

DYNAMO ELECTRIC MACHINE

Filed Nov. 19, 1917

1,454,925

6 Sheets-Sheet 2

WITNESSES:

INVENTOR
Rudolf E. Hellmund
BY
ATTORNEY

May 15, 1923.
R. E. HELLMUND
1,454,925
DYNAMO ELECTRIC MACHINE
Filed Nov. 19, 1917
6 Sheets-Sheet 3
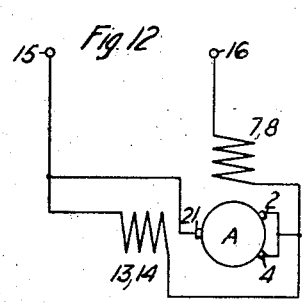
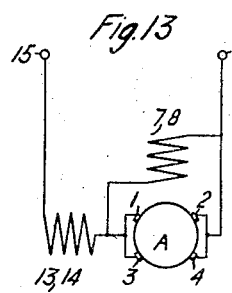
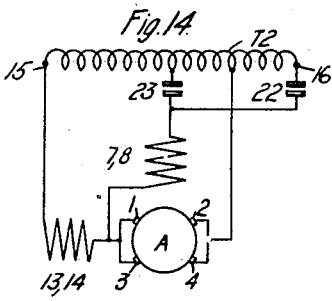
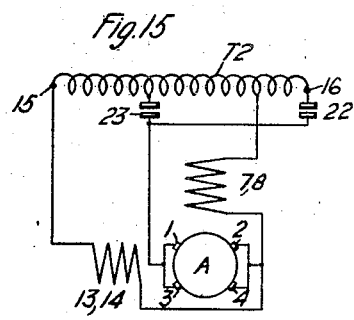
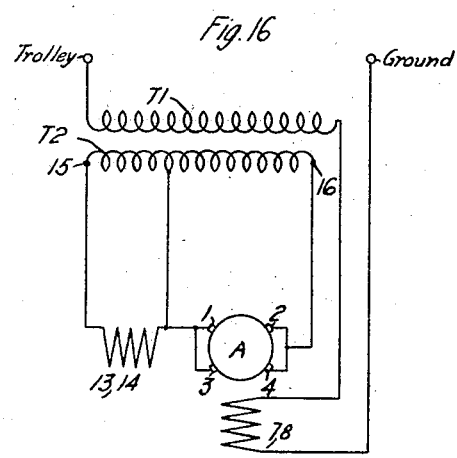
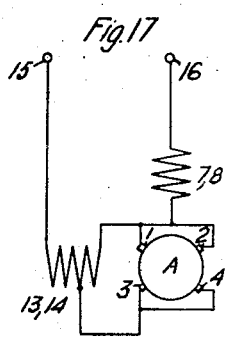
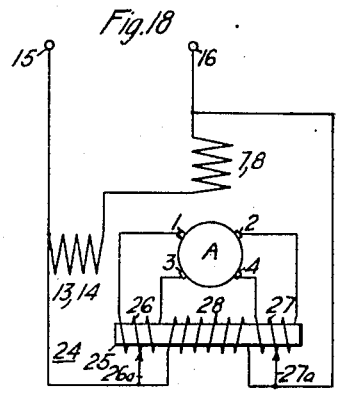
WITNESSES:
INVENTOR
Rudolf E. Hellmund
BY
ATTORNEY May 15, 1923.
R. E. HELLMUND
DYNAMO ELECTRIC MACHINE
Filed Nov. 19, 1917
1,454,925
6 Sheets-Sheet 4
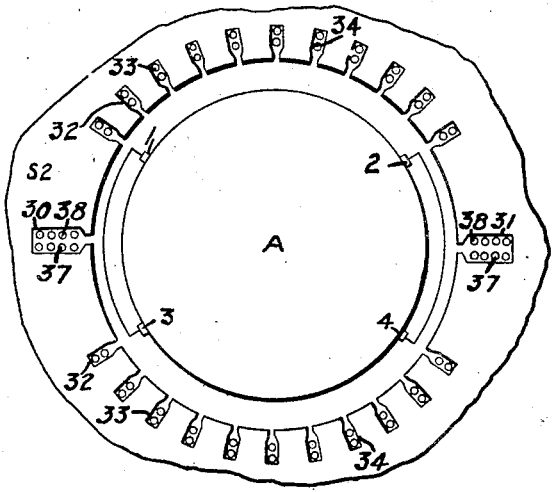
Fig.19.
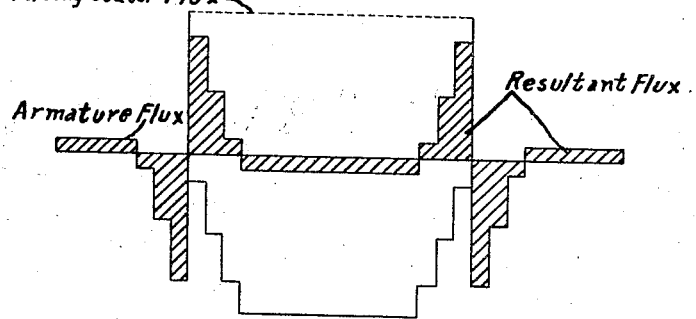
Fig.20.
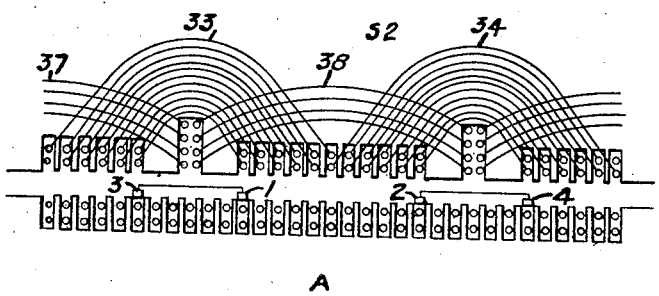
WITNESSES:
Ed. V. Herron
W. R. Coley
INVENTOR
Rudolf E. Hellmund
BY
Wesley G. Carr
ATTORNEY May 15, 1923.
R. E. HELLMUND
DYNAMO ELECTRIC MACHINE
Filed Nov. 19, 1917
1,454,925
6 Sheets-Sheet 5
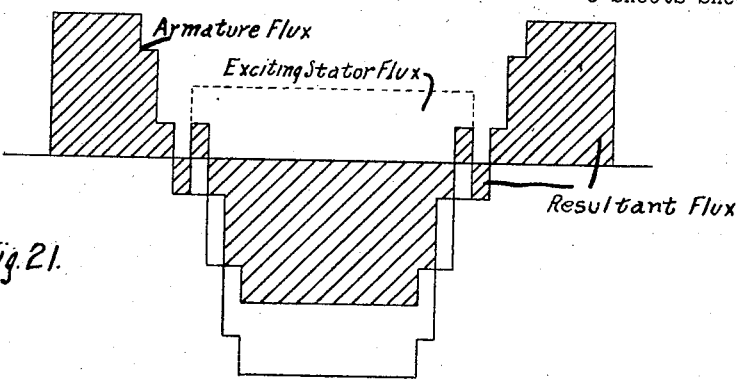
Fig. 21.
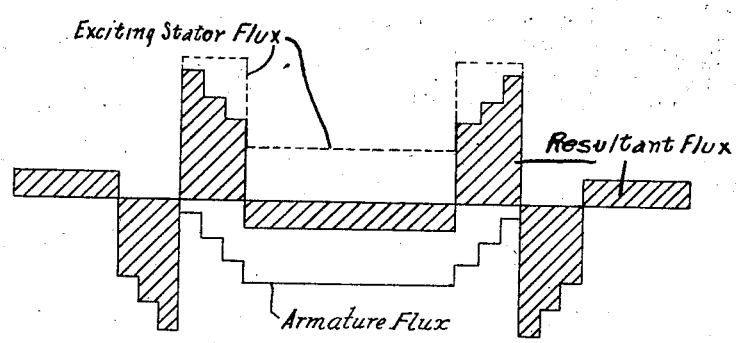
Fig. 22.
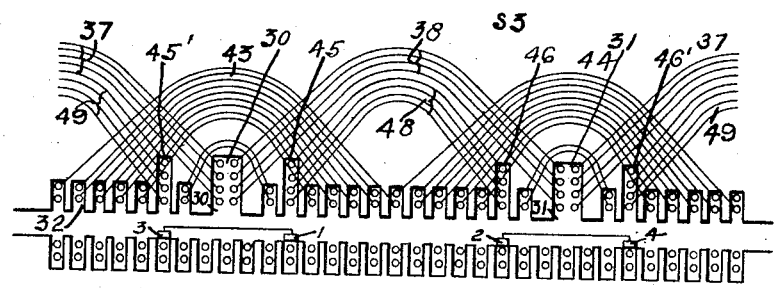
WITNESSES:
Ed. V. Hemon
W. R. Coley
INVENTOR
Rudolf E. Hellmund
BY
Wesley G. Carr
ATTORNEY May 15, 1923.
R. E. HELLMUND
1,454,925
DYNAMO ELECTRIC MACHINE
Filed Nov. 19, 1917  6 Sheets-Sheet 6
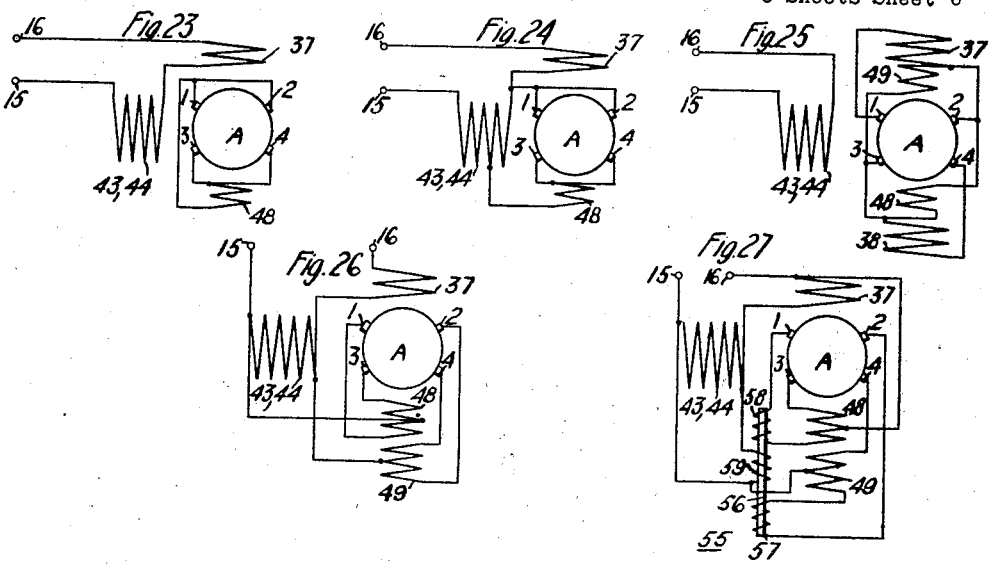
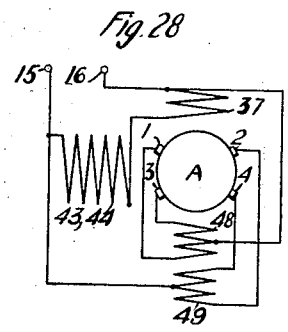
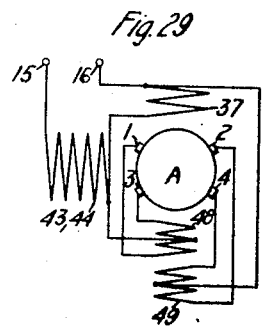
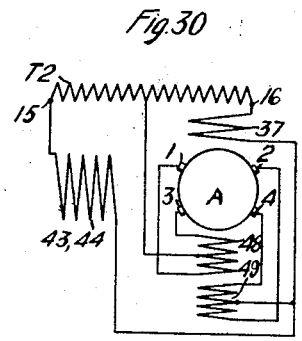
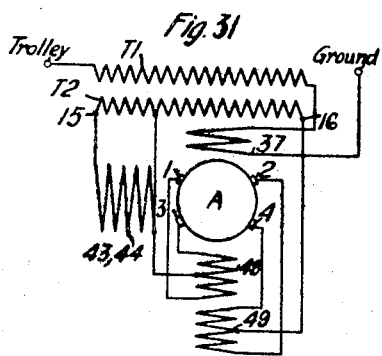
WITNESSES:
J.T. Wurmb
W.R. Coley
INVENTOR
Rudolf E. Hellmund.
BY
Wesley G. Carr
ATTORNEY Patented May 15, 1923.

1,454,925

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed November 19, 1917. Serial No. 202,699.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Dynamo-Electric Machines, of which the following is a specification.

My invention relates to dynamo-electric machines and especially to alternating-current commutator motors of the single-phase type that employ short-circuited armature brushes for the purpose of furnishing or influencing the exciting field-flux.

It is well known in the art, that motors of the above-indicated character, which correspond to what may be termed "armature-excited motors," are incapable of producing sufficient starting torque to accelerate the motors and, in many cases, will not rotate at all unless some external device, such as an inductive coil, is connected across certain of the armature brushes to cause a reduction of the demagnetizing currents flowing in the armature, under starting conditions, whereupon the torque relations are suitable for effecting motor rotation.

It is the object of my present invention to provide a motor of the above-indicated general class which shall be self-starting without necessitating the use of special starting connections, external inductive devices or any other auxiliary apparatus giving, at the same time, satisfactory commutation.

More specifically stated, it is one object of my invention to so locate the stator exciting or torque-producing field winding with respect to the pairs of short-circuited armature brushes influencing the excitation that the resultant of the stator-exciting flux and the armature-demagnetizing flux will be of sufficient amplitude to insure suitable starting and accelerating operation of the motor.

Other objects of my invention will become evident from the following detailed description and are set forth with particularity in the appended claims.

Figure 4:
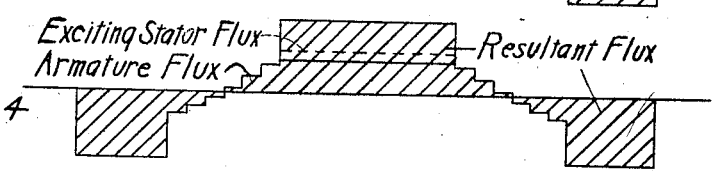
Figure 5:
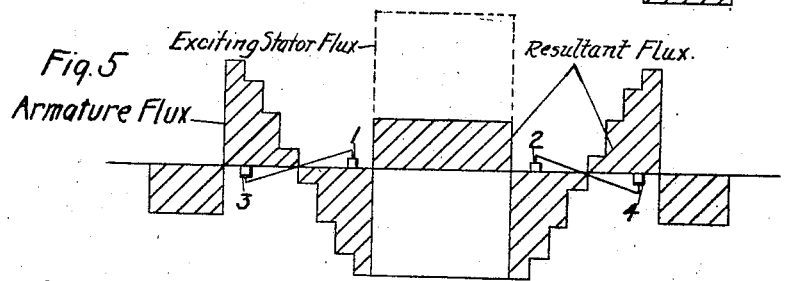

My invention may best be understood by reference to the accompanying drawings, wherein Fig. 1 is a fragmentary view in diagrammatic end elevation, of a dynamo-electric machine constructed in accordance with the present invention; Fig. 2 is a combined diagrammatic view serving to illustrate the relations of fluxes in the machine and also serving to further depict the relation of stator and armature windings; Fig. 3 and Fig. 4 are flux charts, corresponding to Fig. 2, and illustrating the flux conditions in the machine in various stages of operation; Fig. 5 is a similar chart, showing the flux relations in a slightly modified construction; Fig. 6 to Fig. 18, inclusive, are simplified diagrammatic views of various modified connections of the complete armature and stator windings that may advantageously be employed in conjunction with my invention; Fig. 19 and Fig. 20 are views, respectively corresponding to Fig. 1 and Fig. 2, of a modified form of the invention; Fig. 21 is a flux chart serving to further illustrate the flux relations in the machine of Fig. 19, under a different operating condition; Fig. 22 is a view, corresponding to Fig. 2, of another modification of my invention; and Fig. 23 to Fig. 31, inclusive, are diagrammatic views of further modifications of winding interconnections embodying the invention.

Referring to Fig. 1 of the drawings, the structure shown comprises a rotatable armature A, of the familiar commutator type, having a plurality of pairs of short-circuited brushes 1 and 3 and 2 and 4, respectively; and a stator or field-magnet structure S1, preferably of the customary laminated type, that concentrically encloses the armature A.

The brushes, short-circuited for exciting purposes, are symmetrically disposed upon the armature commutator, the brushes comprising each individual pair being spaced in accordance with proper design considerations, preferably by an angle of approximately 72°, as hereinafter more fully set forth. Approximately opposite the brushes 1, 2, 3 and 4 are located a plurality of relatively large stator slots 5, 6, 5' and 6', respectively, while a plurality of smaller slots 9 and 9' are located between the large slots 5 and 5', and also between the other large slots 6 and 6', and a further set of regularly-recurring slots 11 and 11' extend outwardly from each of the large slots 5 and 5' to the corresponding slots 6 and 6'.

A main or exciting field-winding coil 8 is wound in the large slots 5 and 6, as shown in the lower portion of Fig. 2, while a similarly-constructed, but oppositely-wound, coil 7 is located in the slots 5' and 6'. Inducing-field-winding coils 13 and 14, wound in the various slots 9, 9', 11 and 11', in accordance with the familiar concentric type of winding, are also provided. In this way, an exciting or working flux, as indicated by the dotted lines and the corresponding legend in Fig. 2 is induced by the exciting windings 7 and 8 on the stator. The axis of this flux is marked $A_1A_2$ in Fig. 1. The windings 13 and 14, located in the slots 9, 9', 11, 11', etc., induce the so-called inducing field flux along an axis $B_1B_2$ in Fig. 1. The latter flux serves the well-known purpose of transferring a voltage proportional to that of the inducing field winding by transformer action into the armature working conductors or inductors. These working inductors, carrying the working current, which, together with the main flux having the axis $A_1A_2$, produces torque, are located in Fig. 1 between the pairs of brushes 1 and 2, and 3 and 4, and are marked WW.

During starting conditions, the main flux set up by the exciting field winding induces, by transformer action, a voltage in the so-called "armature magnetizing-circuit conductors or inductors" marked $e$ $e$ in Fig. 1 and located between the pairs of brushes 1 and 3 and 2 and 4. Since the armature-exciting-circuit, of which these conductors form a part, is close-circuited by virtue of the external connections between the brushes 1 and 3, and 2 and 4, respectively, a current is set up in the armature-magnetizing or exciting inductors. These inductors act, therefore, like the secondary turns of a transformer, that is, they have a demagnetizing effect upon the main flux. This effect may be represented by a flux having the form of the solid stepped line in Fig. 2, designated as "Armature Flux."

As is well-known, these two fluxes, at starting, substantially annul each other in machines of the prior art and, consequently, an insufficient torque to rotate the armature is produced. However, by concentrating the main or exciting-field-winding coil-sides in the illustrated large stator slots approximately opposite the armature brushes, the resultant flux, that is produced by the exciting stator flux and the armature demagnetizing flux, is sufficient to produce a suitable starting torque, as indicated by the rectangular cross-hatched portion of the flux chart in Fig. 2. The stepped cross-hatched areas do not aid in the development of torque, since their resultant effect upon the exciting-circuit conductors, which are spanned by the pairs of short-circuited brushes, is substantially equal to zero.

The reason for obtaining a suitable starting torque in machines constructed according to the present invention, without requiring a special starting connection or the use of an external inductive device, may be explained as follows. A certain material portion of the lines of force set up by the armature exciting or magnetizing currents does not interlink with the exciting field windings 7 and 8 by reason of the location thereof, or, in other words, a relatively large degree of leakage of the armature magnetizing flux takes place in the zones that are spanned by the short-circuited brushes. Consequently, the resultant self-induction in the armature magnetizing-circuit produces an equilibrium of voltage when the active armature demagnetizing flux caused by the armature currents, the value of which is dependent upon the active armature exciting flux, is smaller than the exciting stator flux, or, in other words, a resultant torque-producing flux passes through the armature.

As the motor increases in speed, the voltage that is produced by rotation of the armature inducing circuit inductors, through the familiar induced or cross-field flux, serves to diminish the demagnetizing currents in the armature, and the arrangement of parts may readily be made such that this demagnetizing current will be substantially nullified under normal load conditions, or have an effect assisting that of the stator exciting winding.

If it is assumed, in accordance with the design of prior-art machines, that the resistance and leakage reactance of the armature magnetizing turns $e$ between the short-circuited brushes is negligible, it is evident that the resultant voltage that is induced in such turns must be equal to zero when the motor is about to start. By mathematically proceeding from this assumption, the relative proportions of the fluxes that are shown in Fig. 2 may be calculated, and the various parts of the motor may be so designed as to produce a desirable value of starting torque flux, as represented by the cross-hatched area above the horizontal datum line. For example, the distance between brushes such as 1 and 2, corresponds to the distance between the large stator slots 5 and 6 and to the width of the dotted rectangle representing exciting stator flux. By computing the results of varying the distance in question over a relatively wide range, it is found that the resultant or available exciting field flux during the starting operation varies with the distance between the unconnected brushes, such as 1 and 2. In this way, it may be determined that the distance between the short-circuited brushes 1 and 3 should equal about 40% of the entire polar circumference to obtain a maximum value for the resultant flux rectangle above the horizontal datum line of Fig. 2. However, when the machine is running, the exciting field flux will be more effective, with a considerably larger distance between the brushes 1 and 2, and, since it has been calculated that the starting torque decreases rather slowly in proportion to the increase of this distance, it appears that a value corresponding to approximately 60% of the polar circumference represents the best compromise condition for both starting and running operation. Consequently, the span covered by each pair of short-circuited brushes preferably equals about 20% of the circumference, or 72 electrical degrees.

As previously mentioned, a voltage is induced in the armature inductors between the short-circuited brushes 1 and 3 and 2 and 4 upon rotation of the armature in the customarily provided inducing field flux, and this voltage tends to decrease the demagnetizing action in the armature until a substantially zero value thereof is attained under certain speed and load conditions. As the motor accelerates, the stator current also inherently decreases. Fig. 3 represents flux conditions in the machine when the stator current is approximately equal to one-half of the starting current, with the armature demagnetizing current substantially zero, and, in this case, a relatively large available torque, represented by the cross-hatched rectangles, is provided.

Upon still further acceleration of the motor, the magnetizing currents in the armature flow in the opposite direction and assist the stator field flux in order to inherently maintain conditions of equilibrium, whereupon conditions similar to that shown in Fig. 4 are secured, the stator current in the case corresponding to Fig. 4 being assumed to be about one-half of the current corresponding to the condition that is illustrated in Fig. 3. The voltages induced by the exciting field flux in the armature magnetizing turns are, practically speaking, approximately the same in both cases, which means that the speed of the motor in the two conditions varies but slightly, assuming, of course, that the inducing field flux has not materially changed. Consequently, it follows that a load change of considerable value does not very seriously affect the speed of a motor constructed in accordance with the present invention, or, in other words, a motor of practically constant-speed characteristic is provided.

Instead of locating the exciting field winding coils 7 and 8 exactly in alinement with the several armature brushes, the winding under consideration may be arranged to span a somewhat different arc in order to permit a more favorable flux distribution for the inducing field winding and to bring about better commutating conditions. One such structure is indicated in Fig. 5, wherein it will be seen that the width of the dotted rectangle representing exciting stator flux, which width corresponds to the distance between the large stator slots 5 and 6, is somewhat less than the distance between the unconnected brushes 1 and 2. Under such conditions, some of the armature working-circuit inductors W, W between pairs of short-circuited brushes are under the influence of negative or reversed field fluxes, which, of course, tends to reduce the resultant or torque-producing flux, as clearly indicated by the several cross-hatched portions of Fig. 5. It will be observed that the available torque increases as the distance between the stator slots in question approaches the distance between the brushes 1 and 2. However, a slight difference is not prohibitive from a practical standpoint and is, therefore, permissible in the event of producing other advantages, such as better commutation or less expensive construction. By mathematical calculations, similarly to those previously mentioned, the best compromise value for the distance between the large stator slots, which corresponds to the width of the dotted rectangle in Fig. 5, may be determined.

Figure 6:
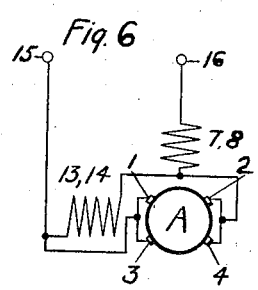

The previous structural features may be employed to advantage in connection with a variety of armature and field-winding connections, some of which are illustrated in Fig. 6 to Fig. 18, inclusive. In Fig. 6, the exciting or torque-producing field-winding coils 7 and 8 are shown located in the axis that passes midway between the brushes 1 and 2, while the inducing field-winding coils 13 and 14 are located in quadrature relation to the exciting field winding. The illustrated supply-circuit terminals 15 and 16 may be connected to any customary source of energy, such as the secondary winding of a transformer, as shown in Fig. 14, for example. The circuits shown in Fig. 6 involve the series connection of the inducing field-winding and the exciting field-winding across the supply terminals, with the pairs of short-circuited armature brushes acting as single terminals and connected to the supply terminal 15 and to a point intermediate the two field windings, respectively.

Figure 7:
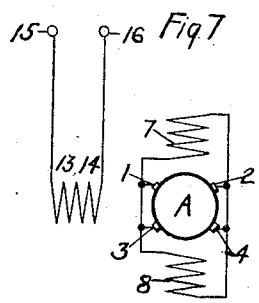

In Fig. 7, the exciting-field-winding coils 7 and 8 are separated and are connected in parallel relation across the short-circuited pairs of brushes, while the inducing-field-winding coils 13 and 14 are connected directly to the supply circuit.

In this case, the exciting field winding is magnetized by the armature working current and is, therefore, in exact phase relation with that current. Assuming that the armature magnetizing current is practically zero under normal operating conditions, it is evident that no corrective voltage in the armature magnetizing circuit is required to compensate for the ohmic resistance of that circuit, or to improve commutating conditions.

Fig. 8 again shows the direct connection of the inducing winding to the supply-circuit terminals, and, in addition, the armature A is connected in series relation with the exciting-field-winding coils 7 and 8 in parallel relation to the inducing field-winding, that is, directly across the supply circuit. In this case, also, the phase relations set forth in connection with Fig. 7 obtain.

Figure 9:
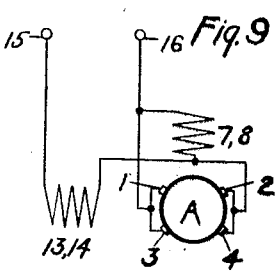

In Fig. 9, the two field windings are connected in series relation to the supply conductors, and the armature A is connected in parallel relation to the exciting-field winding.

Figure 10:
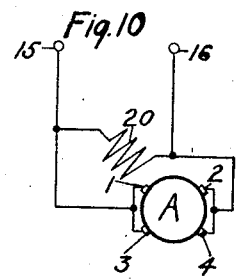

Fig. 10 illustrates the combination of the two field windings in a single symmetrically distributed stator winding 20, the effective magnetizing axis of which is inclined at a predetermined angle in accordance with the relative proportion of parts, as will be understood.

Figure 11:
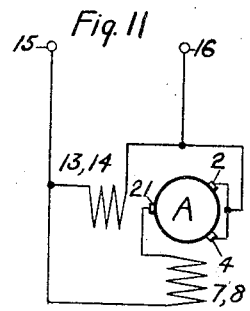
Figure 8:
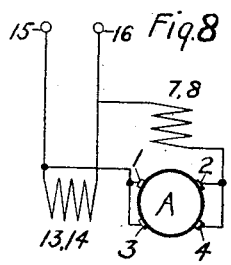

In Fig. 11, the short-circuited brushes 1 and 3 have been replaced by a single brush 21, which is located midway between the positions of the brushes 1 and 3 that are employed in the previous figures, and the system of connections is otherwise similar to that shown in Fig. 8.

Fig. 12 differs from Fig. 6 only in the substitution of a single brush 21 for the spaced brushes 1 and 3, the brush 21 being placed intermediate the locations of the short-circuited brushes 1 and 3, as in Fig. 11.

In Fig. 13, the inducing field winding and the exciting field winding are connected between the supply-circuit terminals 15 and 16, while the armature A of the 4-brush type is connected in parallel relation to the exciting-field-winding coils 7 and 8, but in the reversed relation to that shown in Fig. 9.

In Fig. 14, a secondary transformer winding T2 is shown as connected between the supply-circuit terminals 15 and 16, a switch 22 serving to connect the terminal 16 to the exciting field-winding, while a second switch 23 serves to connect the field winding to an intermediate point in the secondary transformer winding T2. Thus, if desired, the exciting field-winding and the armature may be initially connected across a certain outer section of the transformer winding, in accordance with the familiar reversed "doubly-fed" or "transformer-conduction" connection, and the exciting field-winding may subsequently be connected in series relation with the inducing field-winding across another portion of the transformer winding upon the closure of switch 23 and the opening of switch 22 to effect the straight "doubly-fed" or "transformer-conduction" connection. The particular type of control system that is employed in connection with my invention is immaterial, but Fig. 14 indicates, in a simple manner, the application of my invention to one well-known form of control system for single-phase commutator motors.

In Fig. 15, another type of control system is illustrated in a diagrammatic manner, the armature A and the inducing-field-winding coils 13 and 14 being connected between the transformer-winding terminals 15 and 16 by the closure of switch 22 under starting conditions, at which time the exciting field winding and the armature are also connected in accordance with the reversed "transformer-conduction" connection across an outer section of the transformer winding. Subsequently, upon the closure of switch 23 and the opening of switch 22, the familiar "doubly-fed" or "transformer-conduction" connection obtains, the two field windings being connected across the major portion of the transformer winding, while the armature A and the exciting field-winding are connected across an intermediate portion thereof.

In Fig. 16, the secondary transformer winding T2 is shown as associated with the customary primary transformer winding T1, which is connected through the exciting field-winding coils 7 and 8 to suitable supply-circuit conductors that are respectively marked "Trolley" and "Ground." In this case, the armature A and the inducing-field-winding coils 13 and 14 are connected to the secondary transformer winding 2 in accordance with the well-known transformer conduction circuits.

In some cases, it may be desirable to slightly adjust the phase of the voltage in the armature magnetizing circuit in order to compensate for the ohmic resistance thereof or to improve commutating conditions. Fig. 17 discloses a system wherein the desired result is obtained by connecting a small portion of the inducing field winding in the armature magnetizing circuit. The illustrated short-circuited-brush arrangement adapts the motor for satisfactory operation at synchronous speed, in accordance with familiar principles.

In Fig. 18, a similar phase-adjusting effect is accomplished by connecting a transformer 24 in certain of the machine circuits. The transformer 24 comprises a magnetizable core member 25 and a plurality of coils 26, 27 and 28 surrounding the core and respectively connected across the brushes 1 and 3, across the brushes 2 and 4, and across the supply-circuit terminals 15 and 16. A plurality of movable taps 26a and 27a are also provided for connecting the respective supply-circuit terminals 15 and 16 directly to the transformer coils 26 and 27, which are thus energized both inductively from the transformer winding 28 and conductively through the taps 26a and 27a. The phase of the exciting currents that are induced in the armature A may be modified in either of the ways shown in Fig. 17 and Fig. 18 to effect the desired compensation for the resistance of the armature magnetizing circuit or to improve the commutating characteristics of the machine.

Fig. 19 shows a modified structure wherein the armature A having the pairs of short-circuiting brushes 1 and 3, and 2 and 4, respectively, is enclosed by a stator S2 that is provided with a plurality of relatively large slots 30 and 31 that are located along the line that bisects the angle between each pair of short-circuited "exciting" brushes, the stator core member being also provided with a plurality of sets of smaller slots 32, within which are located a plurality of distributed field coils 33 and 34 for producing the desired inducing-field-winding flux, under operating conditions. The large slots 30 and 31 are provided with exciting-field-winding coils 37 and 38, the relative location of the short-circuited brushes and the large slots being such that the magnetic leakage between the exciting-field-winding turns and the armature-circuit-magnetizing turns is relatively large, as previously described in connection with Fig. 1.

The relation of field windings is also shown in Fig. 20 in conjunction with a flux chart that graphically illustrates the exciting stator flux, the armature demagnetizing flux and the resultant flux, in the manner hereinbefore explained.

The resultant or torque-producing flux obtained by the structure just described is rather small, and, consequently, would not be suitable for starting machines of large capacity or starting friction, etc.

Furthermore, the cross-hatched rectangle, which represents the available torque-producing flux in the present instance, is located below the zero or datum line, and, consequently, the motor will rotate in the opposite direction from that set forth in connection with Fig. 1 and Fig. 2, provided, of course, that, otherwise, the conditions are equal. As the motor accelerates, the cross-field-winding coils 33 and 34 induce a voltage between the short-circuited brushes of each set, which voltage is also opposite to the rotational voltage induced in the previously-described type of motor. Consequently, the induced voltage in the present case will tend to increase the armature-magnetizing currents, while the stator current decreases, as before, upon an increase of motor speed. Fig. 21 shows the flux conditions in various parts of the machine when the motor has accelerated to a certain point.

Since the resultant field flux induces a voltage in the stator-exciting field winding that is opposite to the actual flux produced by that field winding, it is evident, from a consideration of vectorial flux relations, that a leading voltage is thus induced in the exciting-field winding, whereby a predetermined degree of power-factor compensation is effected.

A desirable increase of such resultant flux may be obtained by the use of the winding arrangement that is shown in the lower part of Fig. 22, which combines the structures of Fig. 1 and of Fig. 20 to a certain extent. In general, one small-span coil 48 of the exciting-field winding, or the equivalent, is connected in the armature magnetizing circuit, that is, between the brushes 1 and 3, as diagrammatically illustrated in Fig. 23. In this way, the magnetizing effect of the armature turns proper is desirably assisted, as shown by the flux chart of Fig. 22, comparison being had with Fig. 20.

The structure shown in the lower part of Fig. 22 comprises the armature A with the pairs of short-circuited brushes, as previously described, and a stator S3, which is provided with the relatively large slots 30 and 31, and a plurality of smaller slots 32, as described in connection with Fig. 19, together with a plurality of narrow slots 45, 45', 46 and 46', each having a depth equal to that of the large slots 30 and 31. These narrow slots are located opposite the several brushes of the armature, slots 45 and 46 being located in approximate alinement with the brushes 1 and 2 and being joined by an exciting-field-winding coil 48, while slots 45' and 46' are situated approximately opposite the brushes 3 and 4 and are joined by the turns comprising an exciting-field-winding coil 49. The exciting-field-winding coils 37 and 38 are again associated with the large slots 30 and 31, as previously described in connection with Fig. 19. Inducing-field-winding coils 43 and 44 are distributed through the smaller stator slots 32 to produce the desired compensating action.

It will be observed that the effective torque-producing or resultant flux in Fig. 22 is increased, under starting conditions, over that obtained by the structure of Fig. 19, the resultant flux corresponding to which structure is shown in Fig. 20.

The remaining diagrammatic figures illustrate various connections of the field and armature windings that may be employed in conjunction with the structure that is shown in Fig. 22.

The system shown in Fig. 24 comprises a direct connection of the exciting-field-winding coil 37 and the inducing-field-winding coils 43 and 44 across the supply-circuit terminals 15 and 16, while the armature A is connected, through the small-span portion 48 of the exciting field winding in parallel relation, to a section of the inducing-field-winding coils. In this way, the phase relations of the armature magnetizing circuit may be adjusted to satisfactorily compensate for ohmic resistance or to improve commutating conditions, as previously explained.

The system shown in Fig. 25 discloses a different method for obtaining the desired phase relation of the armature magnetizing turns. In this system, the inducing-field-winding coils 43 and 44 are connected between the supply-circuit terminals 15 and 16, while the exciting-field-winding coil 37 is connected across the working-circuit brushes 1 and 2, and the exciting-field-winding coil 38 is similarly connected across the brushes 3 and 4. In addition, another exciting-field-winding coil 49, having a smaller span or polar face, is connected across the brushes 3 and 2 and a second additional small coil 48 is connected across the same brushes. The combined action of the various field windings tends to produce the desired phase relations in the armature magnetizing circuit, under operating conditions, for the following reasons. The small-span coils 48 and 49 produce a more pointed or peaked field-form than the main exciting coils 47 and 48, and serve to assist the flux set up by the armature magnetizing-circuit inductors, whereas the main coils oppose that flux, as previously explained.

Several other modifications of circuit connections, which are advantageous in various respects, are shown in the remaining figures. The system illustrated in Fig. 26 comprises a direct connection of the inducing-field-winding coils 43 and 44 and the exciting-field-winding coil 37 across the supply-circuit terminals 15 and 16, while the exciting-field-winding coil 48 is connected across the brushes 1 and 3, and the exciting-field-winding coil 49 is connected across the brushes 2 and 4. Furthermore, the mid-points of the exciting-field-winding coils 48 and 49 are connected to the respective terminals of the inducing field winding.

In Fig. 27, a similar arrangement of circuits is provided in conjunction with a transformer 55 that is interposed in the armature magnetizing circuit. The transformer is provided with a suitable core member 56 and a plurality of coils 57, 58 and 59 that are respectively connected in series relation with the exciting-field-winding coils 49 and 48 and in parallel relation to the entire inducing field winding.

The system shown in Fig. 28 differs from that illustrated in Fig. 26 only in the connection of the mid-points of the exciting field windings 48 and 49 directly across the supply-circuit terminals 15 and 16 instead of to the terminals of the inducing field winding.

In Fig. 29, the same field-winding coils are employed and the entire inducing field winding is again connected in series relation with the exciting-field-winding coil 37 between the supply-circuit terminals. However, the exciting-field-winding coil 48 is connected across the armature brushes 1 and 3, while the exciting-field-winding coil 49 is connected across the brushes 2 and 4. The mid-points of the two windings just mentioned are respectively connected to the inner terminal of the inducing field-winding and to the supply-circuit terminal 16.

In Fig. 30, the secondary transformer winding T2 is shown as connected between the supply-circuit terminals 15 and 16, and the entire inducing field winding is again connected in series relation with the exciting-field-winding coil 37 across the transformer winding. The exciting-field-winding coils 48 and 49 are again connected to the armature brushes, as described in connection with Fig. 29, the mid-point of the coil 48, however, being directly connected to an intermediate point of the transformer winding T2, while the mid-point of the coil 49 is connected to a point intermediate the inducing-field-winding coils and the exciting-field-winding coil 37.

In Fig. 31, the inducing field winding is connected across a certain outer section of the transformer winding T2, while the exciting-field-winding coil 37 is connected in series relation with the primary transformer winding T1 between the supply-circuit conductors Trolley and Ground. The remaining exciting-field-winding coils 48 and 49 are again connected across the pairs of armature brushes 1 and 3 and 2 and 4, respectively, while the mid-points of the coils 48 and 49 are respectively connected to the inner terminal of the inducing field winding, that is, to an intermediate point in the secondary transformer winding T2 and to the transformer terminal 16.

I do not wish to be restricted to the specific structural details, circuit connections, or arrangement of parts herein set forth, as various further modifications may be effected without departing from the spirit and scope of my invention. I desire, therefore, that only such limitations shall be imposed as are indicated in the appended claims.

I claim as my invention:

1. A dynamo-electric machine comprising a commutator-type armature, a plurality of spaced sets of short-circuited brushes co-operating therewith, a magnetizable stator member enclosing said armature, an inducing field winding distributed around said stator member, and an exciting field winding so located with respect to said brushes that the magnetic leakage between said exciting field winding and the armature turns connected by said sets of brushes is relatively large, the arrangement being such that a resultant starting flux is produced.

2. A single-phase motor comprising a commutator-type armature, a plurality of brushes associated therewith to permit magnetizing currents to flow in certain armature inductors, a magnetizable stator member enclosing said armature, and an exciting field winding producing a magneto-motive force substantially coaxial with that of the magnetizing armature inductors and having its coil-sides so located with respect to said brushes that the magnetic leakage between said exciting field winding and the armature turns carrying said magnetizing currents is relatively large, the arrangement being such that a resultant starting flux is produced.

3. A single-phase motor comprising a commutator-type armature, a plurality of brushes associated therewith to establish certain zones of magnetizing-circuit inductors and of working-circuit inductors in said armature, a magnetizable stator member enclosing said armature, and an exciting field winding producing a magneto-motive force substantially coaxial with that of the magnetizing armature inductors and including a polar arc larger than the arc covered by said armature working-circuit inductors, the arrangement being such that a resultant starting flux is produced.

4. A single-phase motor comprising a commutator-type armature, a plurality of brushes associated therewith to establish certain zones of magnetizing-circuit and of working-circuit inductors in said armature, and a concentrated-type exciting stator field winding, producing a magneto-motive force substantially coaxial with that of the magnetizing armature inductors, the arrangement being such that a resultant starting flux is produced.

5. A single-phase motor comprising a commutator-type armature, a plurality of brushes associated therewith to establish certain alternate zones of magnetizing-circuit and of working-circuit inductors, one set of said zones covering an arcuate distance of approximately two-thirds the distance covered by the other, and a stator-exciting winding circumferentially distributed in a different manner than the armature-magnetizing-circuit inductors, the arrangement being such that a resultant starting flux is produced.

6. A single-phase motor comprising a commutator-type armature, a plurality of spaced sets of close-circuited brushes co-operating therewith, the arcuate distance between pairs of close-circuited brushes and corresponding to the number of armature inductors included in the magnetizing circuit being approximately equal to 40% of the entire armature circumference, and a stator-exciting winding covering a materially smaller percentage of the circumference, the arrangement being such that a resultant starting flux is produced.

7. A single-phase motor comprising a commutator-type armature, and a plurality of spaced sets of close-circuited brushes co-operating therewith, a magnetizable stator member enclosing said armature, and an exciting field winding producing a magneto-motive force substantially coaxial with that of the magnetizing armature inductors and concentrated in stator slots separated by an arcuate distance materially different from the arc included between adjacent unconnected brushes, the arrangement being such that a resultant starting flux is produced.

8. A single-phase motor comprising a commutator-type armature, a plurality of brushes associated therewith to establish certain zones of magnetizing-circuit and of working-circuit inductors in said armature, and an exciting field winding including a polar arc materially different from the arc including said armature working-circuit inductors, said field winding being symmetrically located opposite the zones of such inductors, the arrangement being such that a resultant starting flux is produced.

9. A single-phase motor comprising a commutator-type armature, a plurality of brushes associated therewith to establish certain zones of magnetizing-circuit and of working-circuit inductors in said armature, and an exciting field-winding concentrated in slots located opposite the central portions of said zones of magnetizing-circuit inductors, the arrangement being such that a resultant starting flux is produced.

10. A single-phase motor comprising a commutator-type armature, a plurality of spaced sets of close-circuited brushes co-operating therewith, a magnetizable stator member enclosing said armature, and an exciting field winding concentrated in stator slots respectively located midway between the brushes of each close-circuited set, the arrangement being such that a resultant starting flux is produced.

11. A dynamo-electric machine comprising a commutator-type armature, a plurality of spaced sets of close-circuited brushes co-operating therewith, a magnetizable stator member enclosing said armature, an inducing field winding distributed around said stator member, and an exciting field winding so located on the stator with respect to said brushes that the magnetic leakage between said exciting field winding and the armature-exciting-inductors is relatively large, the arrangement being such that a resultant starting flux is produced.

12. A single-phase motor comprising a commutator-type armature, a plurality of brushes associated therewith to establish certain alternate zones of magnetizing-circuit and of working-circuit inductors, and a stator exciting winding producing a magneto-motive force substantially coaxial with that of the magnetizing armature inductors and circumferentially distributed in a different manner than the armature magnetizing-circuit inductors, the arrangement being such that a resultant starting flux is produced.

13. A single-phase motor comprising a commutator-type armature, a plurality of brushes associated therewith to permit magnetizing currents to flow in the armature inductors to set up a main field, a magnetizable stator member enclosing said armature, and exciting field-conductors on said stator member for setting up a field of substantially the same axis as that of said main field and being so located with respect to said brushes that the magnetic leakage between said stator-exciting-field-conductors and the armature turns carrying said armature magnetizing currents is relatively large, the arrangement being such that a resultant starting flux is produced.

14. A single-phase motor comprising a commutator-type armature, a plurality of brushes associated therewith to establish certain zones of magnetizing-circuit inductors and of working-circuit inductors in said armature, each magnetizing-circuit zone being materially less than 180 electrical degrees, a magnetizable stator member enclosing said armature, and an exciting field winding producing a magneto-motive force substantially coaxial with that of the magnetizing armature inductors and including a polar arc larger than the arc covered by said armature working-circuit inductors, the arrangement being such that a resultant starting flux is produced.

15. A single-phase motor comprising a commutator-type armature, a plurality of spaced sets of close-circuited brushes co-operating therewith, the arcuate distance between each pair of close-circuited brushes and corresponding to the number of armature inductors included in the magnetizing circuit being materially less than 180 electrical degrees, and a stator-exciting winding covering a materially smaller arcuate distance, the arrangement being such that a resultant starting flux is produced.

16. A single-phase motor comprising a commutator-type armature, and a plurality of spaced sets of close-circuited brushes co-operating therewith to establish certain zones of magnetizing-circuit and of working-circuit inductors in said armature, each magnetizing-circuit zone being materially less than 180 electrical degrees, a magnetizable stator member enclosing said armature, and an exciting field winding concentrated in stator slots separated by an arcuate distance materially different from the arc included between adjacent unconnected brushes, the arrangement being such that a resultant starting flux is produced.

17. A single-phase motor comprising a commutator-type armature, a plurality of brushes associated therewith to establish certain zones of magnetizing-circuit and of working-circuit inductors in said armature, each magnetizing-circuit zone being materially less than 180 electrical degrees, and an exciting field winding concentrated in slots located opposite the central portions of said magnetizing-circuit zones, the arrangement being such that a resultant starting flux is produced.

18. A single-phase motor comprising a commutator-type armature, a plurality of brushes associated therewith to establish certain zones of magnetizing-circuit and of working-circuit inductors in said armature, a magnetizable stator member enclosing said armature, and an exciting field winding on the stator so located with respect to said brushes that the resultant field acting upon the armature working-currents is of a direction opposite to the field set up by said exciting field winding.

19. A single-phase motor comprising a commutator-type armature, a plurality of brushes associated therewith to establish certain zones of magnetizing-circuit and of working-circuit inductors in said armature, and an exciting field winding concentrated in slots located opposite the central portions of said magnetizing-circuit zones, the arrangement of parts being such that the resultant field flux induces a voltage in said exciting field winding that is opposite to the actual flux produced by that winding, the resultant field flux being of such nature as to effect a predetermined degree of power-factor compensation.

20. A single-phase motor comprising a commutator-type armature, a plurality of spaced sets of close-circuited brushes co-operating therewith, a magnetizable stator member enclosing said armature, and an exciting field winding concentrated in stator slots separated by an arcuate distance materially different from the arc included between adjacent unconnected brushes, the arrangement of parts being such that the resultant field acting upon the armature working-currents is of a direction opposite to the field set up by said exciting field winding, the resultant field flux being inherently of such nature as to effect a predetermined degree of power-factor compensation.

21. A single-phase motor comprising a commutator-type armature, a plurality of spaced sets of close-circuited brushes co-operating therewith, an inducing field winding and an exciting field winding connected in series relation, and means for connecting a portion of said inducing field winding in circuit with the pairs of close-circuited brushes.

22. A single-phase motor comprising a commutator-type armature, a plurality of spaced sets of close-circuited brushes co-operating therewith to establish certain zones of magnetizing-circuit and of working-circuit inductors in said armature, an inducing field winding and an exciting field winding each having one terminal connected to one pair of close-circuited brushes, and means for connecting a portion of said inducing field winding in circuit with the magnetizing-circuit inductors of said armature.

23. A single-phase motor comprising a commutator-type armature, a plurality of spaced sets of close-circuited brushes co-operating therewith, an inducing field winding and an exciting field winding connected in series relation, and means for interconnecting said inducing field winding with the pairs of close-circuited brushes, the arrangement being such that the current-flow in said winding is affected by the current-flow in said brushes.

24. A single-phase motor comprising a commutator-type armature, a plurality of spaced sets of close-circuited brushes co-operating therewith to establish certain zones of magnetizing-circuit and of working-circuit inductors in said armature, an inducing field winding and an exciting field winding each having one terminal connected to one pair of close-circuited brushes, and means for interconnecting said inducing field winding with the pairs of close-circuited brushes, the arrangement being such that the circuit-flow in said winding is affected by the current-flow in said brushes.

In testimony whereof, I have hereunto subscribed my name this 29th day of Oct., 1917.

RUDOLF E. HELLMUND.